Patented June 13, 1950

2,511,775

UNITED STATES PATENT OFFICE 2,511,775

PROCESS FOR THE PURIFICATION OF ALUMINUM

Donald H. Kelly, Floral Park, N. Y., and Robert V. Townend, Arlington, N. J., assignors to Allied Chemical & Dye Corporation, New York, N. Y., a corporation of New York No Drawing. Application June 17, 1948, Serial No. 33,683

6 Claims. (Cl. 75—68)

This invention relates to the refining of aluminum and more particularly to the purification of aluminum containing magnesium as a contaminant.

In purifying scrap aluminum, which may contain as much as 10% but more generally contains 1 to 2% magnesium as impurity, refiners generally require magnesium impurity content reduction to not more than a fraction of these values. The amount and cost of the treating or purifying agent needed to meet required specifications as well as the yield of refined metal produced are major considerations. Other factors to be taken into account in the purification procedure include consideration of temperature and time of treatment, and of any nuisance produced as the result of objectionable fumes which may be evolved by the use of a particular treating agent.

This invention aims to reduce the magnesium impurity content of scrap aluminum to a small fraction of the magnesium content of the impure aluminum, preferably to a concentration not greater than 0.1% by processes which require use of comparatively small amounts of readily available purifying agents. The invention also affords an aluminum purifying procedure which involves a lower temperature and shorter time of treatment than heretofore necessary, and which at the same time avoids formation of objectionable fumes.

Other objects and advantages will appear hereinafter.

In accordance with our invention, we have discovered that the magnesium impurity content of aluminum may be substantially reduced by treating the impure aluminum while in the molten state with potassium fluoride and molecular oxygen under the hereinafter described conditions. In carrying out our process, metallic aluminum containing magnesium impurity, e. g. scrap aluminum, is melted in a suitable furnace, and the temperature of the melt is raised to about 1300° F. or appreciably higher. The desired amount of potassium fluoride is added to the melt, and the melt is then subjected to action of molecular oxygen in the presence of the potassium fluoride for a period of time sufficient to reduce the magnesium content to the desired degree, preferably to not more than 0.1% by weight. Following the foregoing treatment, and after allowing the melt to stand for a short time, the dross is skimmed from the surface of the melt, and the purified molten aluminum product removed from the furnace in any convenient manner.

Scrap aluminum, which is ordinarily the type of raw material employed in our process, may contain as high as 10% magnesium. However, the ordinary run of scrap aluminum employed for recovery of purified aluminum usually contains from about 1% to 2% magnesium. Although our process may be satisfactorily operated to reduce the magnesium content of aluminum containing as much as 10% magnesium, it is more advantageously applicable to scrap aluminum of lower magnesium content, e. g. 1% to 2% magnesium.

The impure or scrap aluminum is placed in a suitable container such as a graphite crucible which is then located in a suitable heating zone, e. g. an electric furnace. The temperature of the furnace is raised to preferably above 1300° F., and the desired amount of potassium fluoride is added to the molten metal. Air or other agent containing molecular oxygen is then brought into contact with the melt, and the conditions of treatment maintained for the required length of time.

The molecular oxygen may be introduced as pure oxygen, or more desirably as oxygen gas diluted with inert gas, in order to effectively control the reaction. We prefer to employ air as a source of oxygen. Normally the gas is introduced as a stream below the surface of the melt thereby effecting agitation. Preferably the gas is introduced at the bottom of the melt and permitted to bubble up thru the molten aluminum to thereby effect better dissemination of oxygen throughout the melt. Supplemental agitation, as by stirring, may also be employed. However, the use of air or other gas containing molecular oxygen in the process of our invention is not limited to procedures in which the gas is bubbled thru the melt. Such gas may be effective for our purpose when maintained as a blanket over the surface of the melt, e. g. by exposing the surface of the melt to the atmosphere, provided that there is a large surface of molten metal exposed to the gas in proportion to the amount of metal in the charge. Even in these cases, however, we prefer to stir or otherwise agitate the melt in order to more effectively disseminate the air throughout the melt and thereby enhance the action of the potassium fluoride and oxygen.

The gas containing molecular oxygen is preferably introduced below the surface of the melt at the minimum rate that will effect adequate agitation. Ordinarily, air supply is such as to create mild turbulence in the melt. While continuous feed of air to the melt is preferred, air supply may be intermittent. We find that excessive amounts of oxygen increase the amount of dross, and consequently lower the recovery of the purified metal. Accordingly, the total amount of oxygen added should be the minimum found necessary in any particular operation to reduce the magnesium impurity of the molten aluminum to the degree desired. In practice, in large size batches, effects of atmospheric air are ordinarily negligible because area exposed to atmosphere is small relative to size of batch. But if area is relatively large it may be found that time of air blowing in some instances may be perceptibly lessened because of influences of atmospheric air. Because of permissible variable operating conditions, such as size of the melt, amount of potassium fluoride added, magnesium impurity content of the melt, method of adding the potassium fluoride, and degree of purification desired, it is not possible to specify rates and total amounts of oxygen or air supply which are applicable to all operations.

In accordance with the invention, it has been found that, in conjunction with molecular oxygen, as little as 0.1 part by weight of potassium fluoride per part by weight of magnesium present in the impure aluminum may be effective in reducing the magnesium content to the desired degree, which is preferably 0.1% or less. However, where it is desired to lower the magnesium content to a value considerably less than 0.1%, we may employ up to 6 parts potassium fluoride per part magnesium. With preferred procedures, we may effect adequate purification of aluminum by using potassium fluoride in the range 0.5 to 2.0 parts per part of magnesium. The entire amount of potassium fluoride required may be added to the melt at once or in portions at various intervals during the period of treatment. The potassium fluoride treating agent may be added to the top of the melt. However, we prefer to add the potassium fluoride as a constituent of the gas stream. The particles of the treating agent are thereby uniformly dispersed throughout the melt so as to obtain maximum effect. The rate of removal of impurity is thereby increased and improved results obtained.

Although we prefer to employ potassium fluoride alone, a mixture of potassium fluoride and potassium fluoborate (KBF$_4$) is effective. Such a combination, in addition to bringing about notable reduction of the magnesium impurity content, also confers other desirable properties upon the purified aluminum, for example, fineness of grain. For best results in using such a mixture, it is desirable that the potassium fluoride be present in greater weight proportion than the potassium fluoborate. The total quantity of the above mixture employed may vary, a minimum being an amount such that the potassium fluoride is present in a quantity of at least 0.1 part, preferably 0.5 part, per part magnesium present. In practice, it has been found desirable to employ not more than a total of about 6 parts of such a mixture per part magnesium in the aluminum.

The temperature of treatment must of course be sufficiently high to keep the impure aluminum in the molten state and to promote the reaction between the treating agents and the impure aluminum so as to result in the proper lowering of the magnesium content. We have found a suitable temperature of treatment to lie in the range of about 1300° to 1500° F. For optimum operating conditions, a temperature of 1300° to 1400° F. is preferably employed. The time of treatment of the impure aluminum or duration of the process as a whole, i. e. the time of continuance of heating and supply of oxygen, may vary depending upon the degree of reduction of magnesium content desired and the amount of treating materials added, as well as to some extent upon temperature of treatment employed. In normal operation, a time of treatment from about 15 minutes to two hours is ordinarily necessary to obtain satisfactory results. Taking into consideration the magnesium impurity content of a given impure aluminum, the degree of impurity content reduction desired, the rate of oxygen throughput to be employed, and other permissible variables such as those previously mentioned, for any particular operation the time of treatment may be determined by preliminary test runs, or by suitable chemical anlysis made during progress of such operation.

Upon reduction of the magnesium content to the desired extent, the melt is allowed to stand so as to enable the impurities to come to the surface, following which the dross containing such impurities is skimmed from the surface of the melt. The purified molten aluminum containing preferably not more than 0.1% magnesium may then be removed from the furnace and crucible, and may be cooled preparatory to further processing.

While the mechanism of the reaction of the potassium fluoride and oxygen in lowering the magnesium content of impure aluminum in the process of our invention is not clearly understood, it is believed that the potassium fluoride and the mixture of potassium fluoride and potassium fluoborate act catalytically to promote the formation of the oxide of magnesium from the metal and oxygen, such oxide coming to the surface of the melt and constituting a part of the dross which is readily separable from the aluminum. However, our invention is not intended to be limited by this or any other theory as to the manner in which potassium fluoride functions to decrease the magnesium content of impure aluminum.

Our process affords many advantages over the conventional methods of reducing the magnesium content of impure or scrap aluminum. Only a relatively small amount of potassium fluoride is required, as little as 0.1 to 0.2 part per part of magnesium present being effective to reduce the magnesium content of such impure aluminum to 0.1% or less as compared with the much larger amounts of conventional purifying agents needed. Owing to the small amount of potassium fluoride which may be used in our process, the yield of refined metal is a maximum since much of the loss of purified aluminum results from retention of purified metal by the dross. Inexpensive forms of molecular oxygen, such as air, may be effectively employed. Further, no objectionable fumes are emitted upon reaction of the air with the molten impure aluminum in the presence of the potassium fluoride in our process. Also, since the melting point of this purifying agent is high, it can be introduced into the molten aluminum easily without melting or decomposition, and the potassium fluoride employed in our process functions at a lower temperature, in the neighborhood of 1300°–1400° F., as compared to most conventional purifying agents. Further, the potassium fluoride of the invention does not increase the temperature of the melt appreciably in a manner common to many other purifying agents, and can be readily introduced into the melt in a simple and convenient manner by means of a stream of gas which may function simultaneously to agitate the melt so as to bring about complete purification in a minimum of time. The time necessary for complete purification in accordance with the process of our invention is shorter than in the case of known processes employing other purifying agents. Finally, as another advantage over known processes, most of the potassium fluoride employed may be recovered for reuse by leaching the dross with hot water, filtering the leach solution, and evaporating off the water.

The following examples are illustrative of the manner in which our process is carried out, all quantities being expressed in parts by weight:

Example 1.—800 parts of scrap aluminum containing 0.80% magnesium were melted in a graphite crucible heated in an electric furnace. The temperature of the molten aluminum was raised to 1300° F. Air was blown in at the bottom and bubbled thru the melt at a rate of about 1.2 parts (by weight) per minute. 8 parts of potassium fluoride (1.25 parts per part of magnesium) were mixed with this air stream and thereby added to the melt. After maintaining the foregoing temperature and air blowing conditions for about 30 minutes air flow thru the melt was discontinued and the melt was allowed to stand for a short time to enable the impurities to come to the surface. The dross was skimmed off, and the melt poured out and, after cooling, the purified aluminum, amounting to 735 parts, was analyzed and contained 0.01% magnesium.

Example 2.—1011 parts of scrap aluminum containing 1.37% magnesium were melted in a graphite crucible heated in an electric furnace. The temperature of the molten aluminum was raised to 1350° F. Air was blown in at the bottom and bubbled thru the melt at a rate of about 1.2 parts (by weight) per minute. 1.4 parts of potassium fluoride (0.1 part per part of magnesium) were mixed with the air stream and thereby added to the melt. After maintaining the foregoing temperature and air blowing conditions for 10 minutes during which time all of the aforementioned potassium fluoride was added, a sample of the melt was taken, but temperature maintenance and air blowing of the melt were continued for another 20 minutes. After skimming and cooling, the sample taken at the 10 minute interval was analyzed and found to contain 0.3% magnesium. At the end of the 30 minute interval, air flow thru the melt was discontinued and the melt was allowed to stand for a short time to enable the impurities to come to the surface. The dross was skimmed off, the melt poured out and, after cooling, the purified aluminum, amounting to 957 parts, was analyzed and contained 0.05% magnesium.

Example 3.—978 parts of scrap aluminum containing 9.20% magnesium were melted in a graphite crucible heated in an electric furnace. The temperature of the molten aluminum was raised to 1350° F. Air was blown in at the bottom and bubbled thru the melt at a rate of about 1.2 parts (by weight) per minute. 90 parts of potassium fluoride (1.0 part per part of magnesium) were mixed with the air stream and thereby added to the melt. After maintaining the foregoing temperature and air blowing conditions for 50 minutes during which time all of the aforementioned potassium fluoride was added, a sample of the melt was taken, but temperature maintenance and air blowing of the melt were continued for another 10 minutes. After skimming and cooling, the sample taken at the 50 minute interval was analyzed and found to contain 0.5% magnesium. At the end of the 60 minute interval, air flow thru the melt was discontinued and the melt was allowed to stand for a short time to enable the impurities to come to the surface. The dross was skimmed off, the melt poured out and, after cooling, the purified aluminum, amounting to 685 parts, was analyzed and contained 0.3% magnesium.

Example 4.—1000 parts of scrap aluminum containing 1.37% magnesium were melted in a graphite crucible heated in an electric furnace. The temperature of the molten aluminum was raised to 1350° F. Molecular oxygen was blown in at the bottom and bubbled thru the melt at a rate of about 1.2 parts (by weight) per minute. 13.7 parts of potassium fluoride (1.0 part per part of magnesium) were mixed with the oxygen stream and thereby added to the melt. All of the potassium fluoride was added during the first 15 minute period of oxygen treatment but temperature maintenance and oxygen treatment of the melt were continued for another 15 minutes. At the end of the 30 minute interval, oxygen flow thru the melt was discontinued and the melt was allowed to stand for a short time to enable the impurities to come to the surface. The dross was skimmed off, the melt poured out and, after cooling, the purified aluminum, amounting to 840 parts, was analyzed and contained 0.05% magnesium. In Examples 1 to 4, the runs were carried out under a blanket of $CO_2$ in order to facilitate accuracy of results.

Example 5.—1000 parts of scrap aluminum containing 0.50% magnesium were melted in a graphite crucible which was heated in an electric furnace. The temperature of the molten aluminum was raised to 1350°–1400° F. 15 parts of potassium fluoride (3.0 parts per part of magnesium) were added directly to the surface of the melt. Air was blown in through a tube extending to the bottom and bubbled thru the melt at a rate of about 1.2 parts (by weight) per minute. After maintaining the foregoing temperature and air blowing conditions for about 30 minutes, air flow was discontinued and the melt was allowed to stand for a short time to enable the impurities to come to the surface. The dross was skimmed off, the melt poured out and, after cooling, the purified aluminum, amounting to 750 parts, was analyzed and contained 0.01% magnesium.

Example 6.—1008 parts of scrap aluminum containing 0.80% magnesium were melted in a graphite crucible heated in an electric furnace. The temperature of the molten aluminum was raised to 1300°–1350° F. 8 parts of a treating agent mixture consisting of 75% potassium fluoride and 25% potassium fluoborate (1.0 part of treating agent per part of magnesium) were added directly to the surface of the melt. Air was blown in at the bottom and bubbled thru the melt at a rate of about 1.2 parts (by weight) per minute. After maintaining the foregoing temperature and air blowing conditions for about 15 minutes a sample of the melt was taken, but temperature maintenance and air blowing of the melt were continued for another 15 minutes. After skimming and cooling, the sample taken at the 15 minute interval was analyzed and found to contain 0.3% magnesium. At the end of the 30 minute interval, air flow thru the melt was discontinued and the melt was allowed to stand for a short time to enable the impurities to come to the surface. The dross was skimmed off, the melt poured out and, after cooling, the purified aluminum, amounting to 868 parts, was analyzed and contained 0.01% magnesium.

Following Examples 7-9 illustrate practice in which oxygen of the atmosphere is disseminated throughout the melt during treatment by employing a relatively shallow melt and thorough agitation instead of bubbling air thru the melt.

*Example 7.*—50 parts of scram aluminum containing 1% magnesium were melted in a graphite container which was heated in an electric furnace. The temperature of the molten aluminum was raised to between 1300°-1400° F. The melt had a large surface area (in comparison with the volume) exposed to the atmosphere and the depth of the melt was about 1¼ inches. .125 part of potassium fluoride (0.25 part per part of magnesium) was added to the surface of the melt while the melt was being thoroughly agitated. For a period of 2 hours, during which time the temperature was maintained at 1300°-1400° F., the mixture was stirred thoroughly for a short time after each 15 minute interval and at the end of the 2 hour period was allowed to stand for a short time to enable the impurities to come to the surface. The dross was then skimmed off, the melt poured out and after cooling, the purified aluminum product was analyzed. About 48 parts of purified aluminum containing 0.03% magnesium were obtained.

*Example 8.*—30 parts of scrap aluminum containing 9.2% magnesium were treated for 2 hours with 13.3 parts of potassium fluoride (4.8 parts per part of magnesium) at a temperature of about 1400° F. 23 parts of purified aluminum product were obtained containing 0.05% magnesium. Except as indicated, the procedure was substantially the same as in Example 7.

*Example 9.*—27 parts of scrap aluminum containing about 2.1% magnesium were treated at about 1400° F. for 2 hours with 2.7 parts of a treating agent mixture consisting of 60% potassium fluoride and 40% potassium fluoborate (4.8 parts of the treating agent per part of magnesium). 25 parts of purified fine-grain aluminum product containing 0.01% magnesium were recovered. Except as indicated, the procedure was substantially the same as in Example 7.

We claim:

1. The process of purifying aluminum containing magnesium in amount not substantially greater than 10% by weight as an impurity which comprises contacting the impure aluminum while in the molten state with molecular oxygen and with 0.1 to 6 parts potassium fluoride per part magnesium present for a period of time sufficient to substantially reduce the magnesium content.

2. The process of purifying aluminum containing magnesium in amount not substantially greater than 10% by weight as an impurity which comprises contacting the impure aluminum while in the molten state with a gas comprising molecular oxygen and with a mixture of potassium fluoride and potassium fluoborate in amount not substantially more than 6 parts per part of magnesium present, the potassium fluoride being present in greater weight proportion than the potassium fluoborate and in a quantity of at least 0.1 part per part magnesium present, for a period of time sufficient to reduce the magnesium content to not more than 0.1%.

3. The process which comprises incorporating in a melt of aluminum, containing substantially more than 0.1% but not substantially more than 10% by weight magnesium as an impurity, 0.1 to 6 parts potassium fluoride per part magnesium present, and passing air thru said melt for a period of time sufficient to reduce the magnesium content to not more than 0.1%.

4. The process of purifying aluminum which comprises heating aluminum containing substantially more than 0.1% but not substantially more than 10% by weight magnesium as an impurity to temperature in the range of about 1300°-1500° F. to produce a melt, incorporating into said melt, 0.1 to 6 parts potassium fluoride per part magnesium present, passing a stream of gas comprising molecular oxygen thru said melt, maintaining said temperature and continuing said passage of gas for a period of time sufficient to reduce the magnesium content to not more than 0.1%, removing the dross formed from the surface of the melt, and recovering aluminum containing not more than 0.1% magnesium.

5. The process of purifying aluminum which comprises heating aluminum containing substantially more than 0.1% but not substantially more than 10% by weight magnesium as an impurity to a temperature in the range of about 1300°-1400° F. to produce a melt, passing a stream of air thru said melt, incorporating into said melt 0.5 to 2.0 parts potassium fluoride per part magnesium present by adding said potassium fluoride to said stream of gas, maintaining said temperature and passing said gas stream thru said melt for a period of time sufficient to reduce the magnesium content to not more than 0.1%, removing the dross formed from the surface of the melt, and recovering aluminum containing not more than 0.1% magnesium.

6. The process of purifying aluminum containing magnesium in amount not substantially greater than 10% by weight as an impurity which comprises treating the impure aluminum while in the molten state with a gas comprising molecular oxygen and with a mixture of potassium fluoride and potassium fluoborate in amount not substantially more than 6 parts per part of magnesium present, the potassium fluoride being present in greater weight proportion than the potassium fluoborate and in a quantity of at least 0.1 part per part of magnesium present, under conditions to substantially reduce the magnesium content.

DONALD H. KELLY.
ROBERT V. TOWNEND.

REFERENCES CITED

The following references are of record in the file of this patent:

UNITED STATES PATENTS

| Number | Name | Date |
|---|---|---|
| 1,541,778 | Argicola | June 16, 1925 |
| 2,195,217 | Lindenberger et al. | Mar. 26, 1940 |

OTHER REFERENCES

Anderson, Secondary Aluminum, First edition, published 1931, by the Sherwood Press, Inc., Cleveland, Ohio, pp. 305 and 306.